(12) United States Patent
Groll

(10) Patent No.: US 10,040,118 B2
(45) Date of Patent: Aug. 7, 2018

(54) GRAPHITE ENCAPSULATED COOKWARE

(75) Inventor: William A. Groll, McMurray, PA (US)

(73) Assignee: All-Clad Metalcrafters LLC, Canonsburg, PA (US)

(*) Notice: Subject to any disclaimer, the term of this patent is extended or adjusted under 35 U.S.C. 154(b) by 577 days.

(21) Appl. No.: 12/859,308

(22) Filed: Aug. 19, 2010

(65) Prior Publication Data

US 2011/0041708 A1 Feb. 24, 2011

Related U.S. Application Data

(60) Provisional application No. 61/235,020, filed on Aug. 19, 2009.

(51) Int. Cl.
*A47J 37/10* (2006.01)
*B22D 19/00* (2006.01)
*A47J 27/00* (2006.01)
*A47J 36/02* (2006.01)

(52) U.S. Cl.
CPC ........ *B22D 19/0045* (2013.01); *A47J 27/002* (2013.01); *A47J 36/02* (2013.01); *A47J 37/10* (2013.01); *B22D 19/00* (2013.01)

(58) Field of Classification Search
CPC ...... A47J 37/10; A47J 37/0611; A47J 37/067; B22D 19/00; B22C 9/04; C22B 9/18
USPC .......... 99/422, 372, 445; 164/112, 111, 76.1; 164/492; 126/390.1
See application file for complete search history.

(56) References Cited

U.S. PATENT DOCUMENTS

| | | | | |
|---|---|---|---|---|
| 1,447,813 A * | 3/1923 | Charles | ................... | A47J 37/10 126/376.1 |
| 2,526,687 A * | 10/1950 | Reams | .......... | 266/275 |
| 2,765,728 A * | 10/1956 | Pearce | ............. | 99/372 |
| 3,847,068 A * | 11/1974 | Beer | ................. | A47J 37/10 126/390.1 |
| 4,248,925 A | 2/1981 | Ambrogi | | |
| 4,260,405 A | 4/1981 | Ambrogi | | |
| 4,350,259 A * | 9/1982 | Cartossi | ................. | A47J 36/02 126/390.1 |
| 4,432,340 A | 2/1984 | Conant et al. | | |
| 4,541,411 A * | 9/1985 | Woolf | ........... | 126/390.1 |
| 4,768,427 A * | 9/1988 | Cheng | ........... | 99/422 |
| 4,940,635 A * | 7/1990 | Andrieu et al. | ............ | 428/408 |
| 5,506,062 A * | 4/1996 | Flammang | ........... | A47J 27/002 126/390.1 |
| 5,564,590 A * | 10/1996 | Kim | ......... | A47J 36/02 126/390.1 |
| 5,647,271 A * | 7/1997 | Capelle | ............ | A47J 36/02 126/390.1 |
| 5,878,656 A * | 3/1999 | Fletcher | ............... | A47J 37/101 220/669 |
| 5,967,024 A * | 10/1999 | DeMars | ............... | A47J 37/108 126/383.1 |
| 6,087,634 A * | 7/2000 | Cook | ..................... | F24C 15/16 219/392 |
| 6,605,368 B2 | 8/2003 | Smith | | |
| 2001/0035098 A1 | 11/2001 | Peng | | |
| 2005/0186343 A1* | 8/2005 | Ge | ............... | 427/248.1 |

(Continued)

*Primary Examiner* — Reginald L Alexander
(74) *Attorney, Agent, or Firm* — The Webb Law Firm

(57) ABSTRACT

Cookware in the form of a grill plate, griddle plate, waffle iron, panini press or the like is made from a cast composite including a graphite core plate encapsulated within a cast metal shell of aluminum or stainless steel, and a method for manufacturing same.

15 Claims, 4 Drawing Sheets

(56) References Cited

U.S. PATENT DOCUMENTS

2006/0225861 A1\* 10/2006 Bowles et al. ................ 164/472
2009/0152276 A1\* 6/2009 Groll .......................... 220/573.4
2010/0255340 A1\* 10/2010 Ge ............................... 428/655

\* cited by examiner

GRAPHITE ENCAPSULATED COOKWARE

CROSS-REFERENCE TO RELATED APPLICATION

This application claims priority to U.S. Provisional Patent Application No. 61/235,020 filed Aug. 19, 2009, which is incorporated by reference herein in its entirety.

BACKGROUND OF THE INVENTION

Field of the Invention

The present invention relates generally to cookware and, more particularly, to cookware such as griddle plates and grill plates having improved thermal conductivity and uniform heating over an uneven heat source (such as a gas burner) by virtue of a core plate of high thermal conductivity, for example, a graphite plate encapsulated in a cast envelope of a metal such as aluminum or stainless steel.

Description of Related Art

To the best of my knowledge and belief, there has not been any cookware made or attempted prior to my invention which comprises a core plate of a high thermally conductive material such as graphite encapsulated within an envelope of an outer cast metal, such as aluminum or stainless steel. There have been attempts to encapsulate a graphite plate within a ceramic shell, but the ceramic/porcelain material is prone to chipping, cracking, and staining and possesses a coefficient of thermal conductivity far inferior to that of a metal such as aluminum.

SUMMARY OF THE INVENTION

Briefly stated, the present invention is directed to cookware, such as a grill plate or a griddle plate or the like, comprising a core plate of a material having a high coefficient of thermal conductivity, such as graphite, which is encapsulated within a cast envelope of aluminum, stainless steel, or other metal. The grill plate provides a rapid thermal response and a uniform temperature distribution across the cook surface by virtue of the graphite core plate which is particularly beneficial when the grill plate is being heated by spaced-apart gas or electric burners on a cook stove.

DETAILED DESCRIPTION OF THE INVENTION

Figure 1:
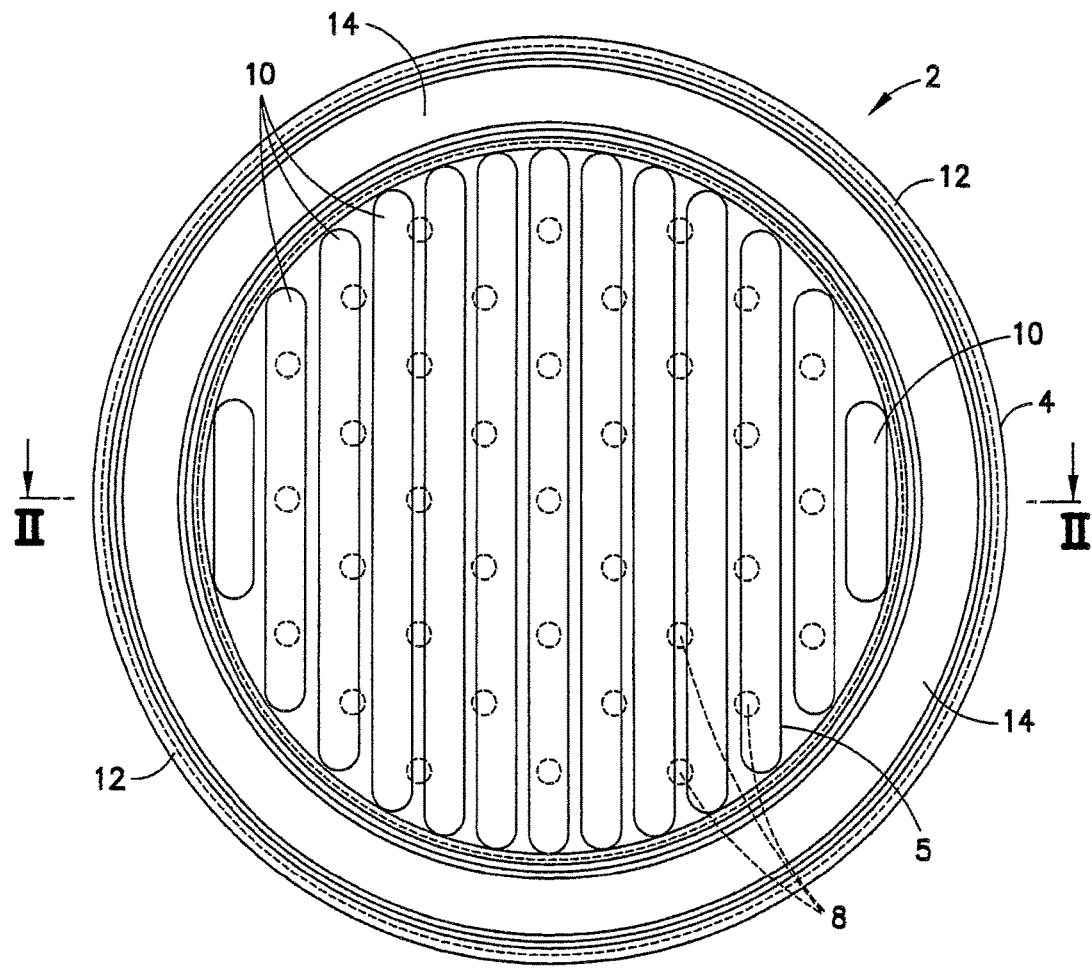
FIG. 1 is a plan view of a presently preferred embodiment of a grill plate according to the present invention.
Figure 2:
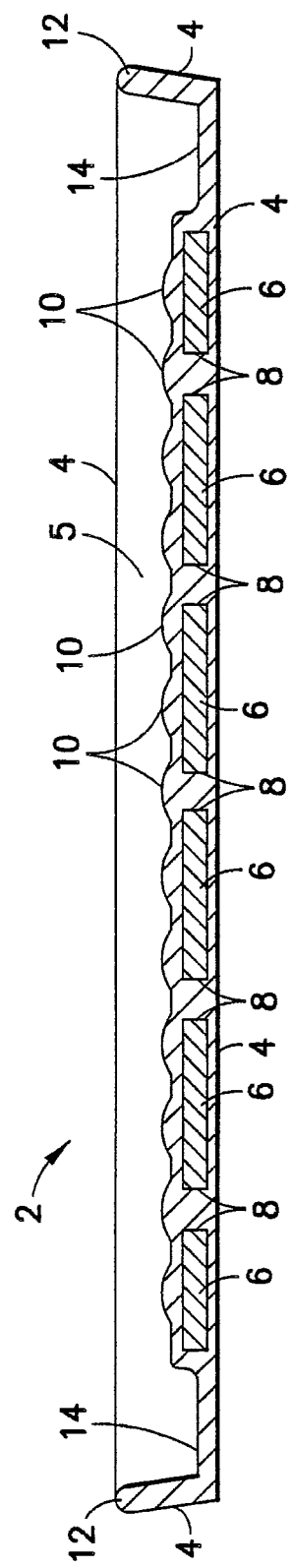
FIG. 2 is a cross-section taken along line II-II of the grill plate of FIG. 1.
Figure 3:
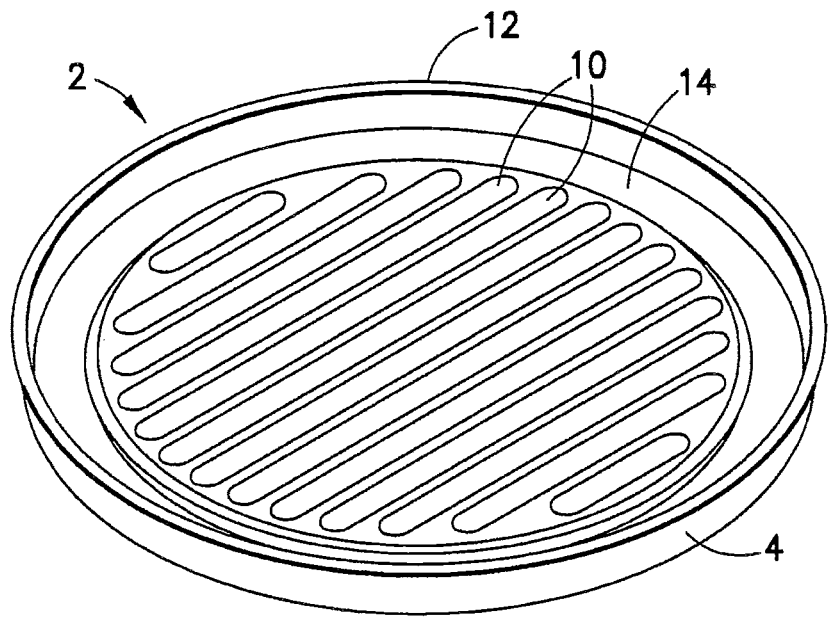
FIG. 3 is a perspective view of the grill plate of FIGS. 1 and 2 of the present invention.

With reference to the appended drawings, one presently preferred embodiment of the graphite encapsulated cookware of my invention is shown as a round grill plate 2 in FIGS. 1-3. This embodiment is intended to be placed on top of a single gas or electric burner of a kitchen cooktop for heating. The grill plate 2 has a cast metal shell 4, preferably of a cast aluminum alloy. The cast metal shell 4 could also be made from a cast stainless steel material. Residing within the cast metal shell 4 is a graphite core plate 6. The cast metal envelope or shell 4 completely surrounds/encapsulates the graphite core plate 6 and intimately contacts the upper and lower planar surfaces of the graphite core plate 6 to ensure superior thermal conductivity between the cast metal and the graphite. In this regard, it is important to eliminate any air gaps between the cast metal shell 4 and the graphite core plate 6 which would act as thermally insulated areas and create unwanted cold spots or uneven temperatures on the cook surface 5 of the grill plate 2. In order to eliminate air gaps between the graphite core plate 6 and the cast metal shell 4, it is necessary to preheat the graphite core plate 6 prior to casting the metal shell 4 therearound. In this manner, the molten metal will flow around the preheated, hot graphite core plate 6 during casting and remain in a molten state longer to ensure proper mold filling. The casting can be made in a sand mold, permanent mold, or by centrifugal casting, which are all well known casting techniques.

In order to improve attachment between the graphite core plate 6 and the cast metal shell 4, the core plate 6 preferably has a plurality of spaced-apart holes 8 formed therethrough. During casting, molten metal of the shell 4 will flow through the holes 8 to securely join the portions of the cast metal shell 4 above and below the graphite core plate 6 when the molten metal solidifies, as best seen in FIG. 2.

The grill plate 2 also has a plurality of spaced-apart raised ribs 10 formed on the cast metal cook surface 5 thereof. The raised ribs 10 are integrally formed in the cast metal shell 4 by appropriate concave shaped areas in the mold (not shown). The raised ribs 10 provide a pattern of seared grill marks on the cooked food product which is desired during grilling of meat or vegetables, for example. The grill plate may also have a non-stick coating such as a PTFE or the like applied thereto on the cook surface.

The grill plate 2 also preferably has an upstanding rim 12 around its outermost perimeter which defines a grease collection trough 14 around the outer perimeter thereof. The trough 14 is formed below the raised ribs 10 to allow the grease/cooking fat to flow by gravity from the area of the raised ribs 10 to the collection trough 14.

The grill plate 2 may also have an outwardly horizontally flared gripping means (not shown) cast therein along the raised rim 12, or handles (not shown) could also be attached to the raised rim 12 to provide a convenient lifting means for the grill plate 2.

Of course, it will be understood that the raised ribs 10 could be eliminated in order to provide a flat cook surface for griddle plate-type of cookware. In addition, the cook surface could be cast in such a manner so as to provide a waffle iron configuration on the cook surface (not shown). Such waffle iron-type cookware, including a panini press, would comprise two matching halves of cast metal shells hinged together with each having a graphite core plate therein.

In still another embodiment, the cookware of my invention can have the configuration of a grill plate 2 on one side with the raised ribs 10 and the configuration of a griddle plate with a flat surface on the other side, thus providing two functions in one piece of cookware.

Figure 5:
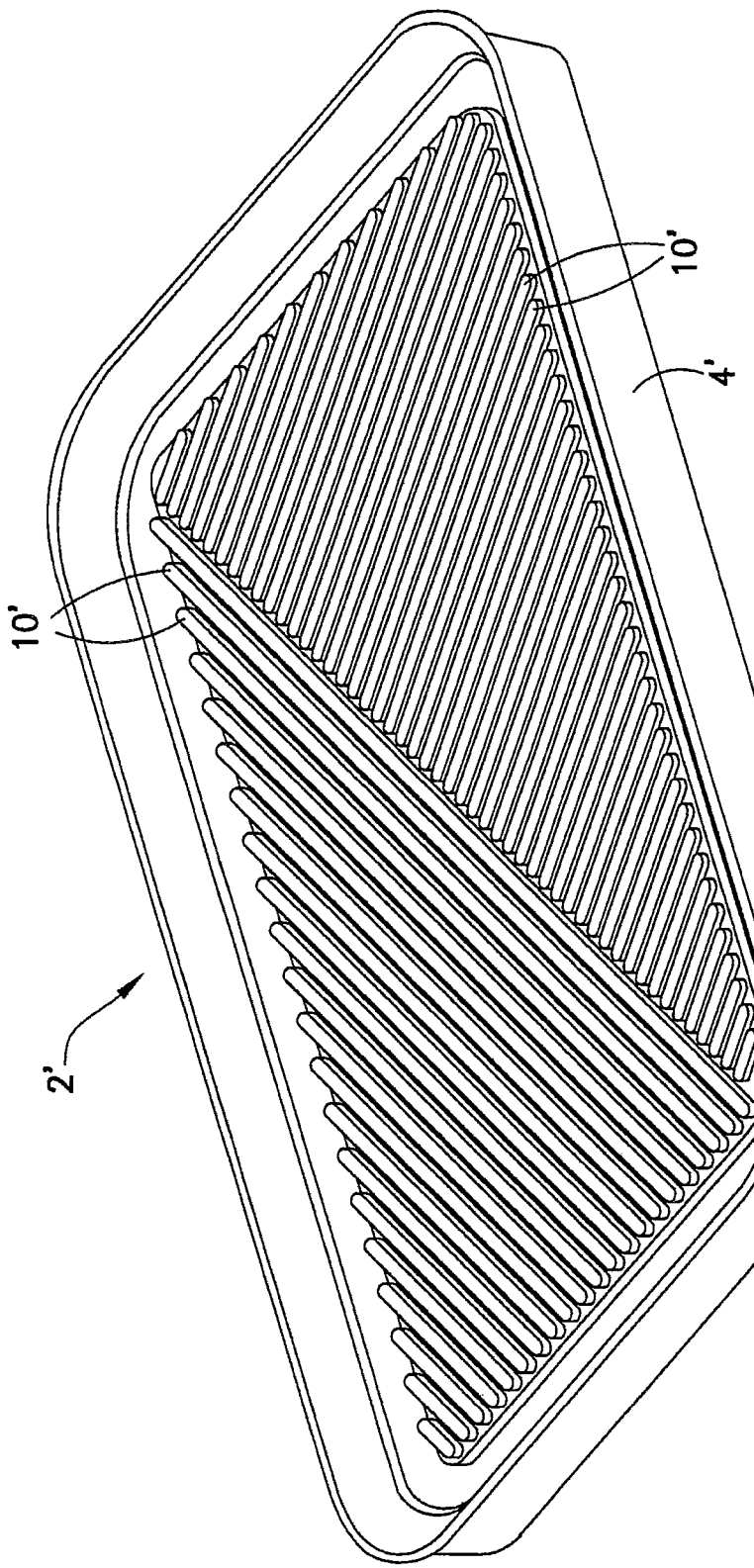
FIG. 5 is another presently preferred embodiment of the present invention in the form of a rectangularly shaped grill plate.

Still further as seen in FIG. 5, the grill plate 2 described above can assume a shape other than the round shape of FIGS. 1-3. As depicted in FIG. 5, the grill plate (or griddle plate) 2' can be cast in a larger rectangular shape so as to encompass two burners, for example, on a kitchen cooking range. In this embodiment, the graphite core plate would also be formed in a rectangular shape to conform to the shape of the cast metal shell 4'. The rectangular shape of the grill plate 2' shown in FIG. 5 could also be suitable for the manufacture of a commercial griddle plate. Of course, the raised ribs 10' would be eliminated during casting to provide a flat cook surface which is desired in griddle plates.

EXAMPLE

Figure 4:
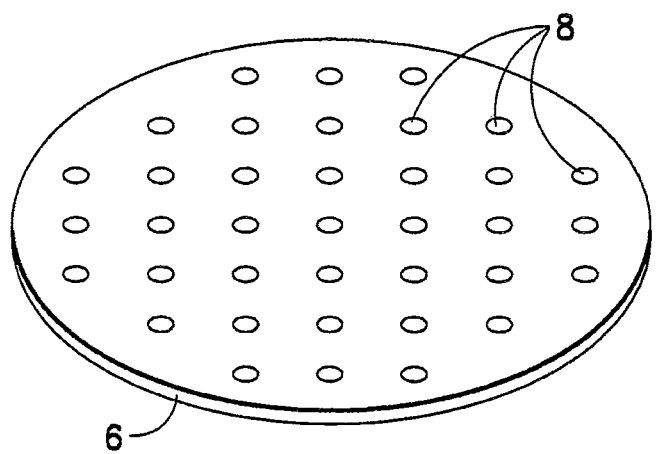
FIG. 4 is a perspective view of the graphite core plate used in a presently preferred embodiment of the present invention.

A number of round grill plates 2 as shown in FIGS. 1-3 were made using a round graphite core plate 6 (FIG. 4) of 10.875 inches in diameter, having a total of 41 through holes of 0.375 inches in diameter formed therethrough. The graphite core plate 6 was positioned in a mold and an aluminum alloy was cast therearound to form the cast metal shell 4. The round cast metal shell 4 had a diameter of 13 inches. As shown in FIGS. 1-3, raised ribs 10 were integrally cast in the cast metal shell 4 along the cook surface. The grill plates 2 were placed on a gas burner of a range and thermographical imaging tests were performed comparing the performance against a conventional solid cast aluminum grill plate without a graphite core plate.

Thermographic imaging of cookware of the present invention such as the grill plate 2 reveals that the graphite core plate 6, when situated within a cast metal shell 4 of aluminum, heats more rapidly to a uniform temperature and retains heat to provide for a more rapid thermal recovery than does a comparative grill plate of cast solid aluminum alloy without a graphite core plate. The cookware of the present invention provides a cook surface which heats to a uniform temperature thereacross more rapidly and maintains that temperature compared with conventional cast aluminum cook surfaces, even when cold or frozen food products are placed thereon. This feature provides for more economical cooking because it uses less energy and also provides for safer cooking because all areas of the cook surface are at a uniform temperature to ensure that the food product, such as hamburger meat, is properly cooked. This uniform cooking benefit is particularly important in commercial griddle plates to guard against the threat of *E. coli* resulting from the undercooking of frozen hamburger patties at higher throughput rates common to commercial cooking operations.

In embodiments where the cookware has a cast metal shell 4 of aluminum, the outer surface may be anodized, preferably in a dark color, such as black, to help absorb the heat and to provide a hard scratch resistant and attractive appearance. The cook surface also preferably has a non-stick surface such as a PTFE material or the like applied thereto.

When stainless steel is used as the material for forming the cast metal shell 4, the exterior surfaces thereof are preferably polished. A polished stainless steel surface is attractive and provides a more stick-resistant cook surface.

It is further contemplated that the cookware of the present invention could be made with an embedded electrical heating means (not shown) below the graphite core plate 6. Such portable electrically heated appliances using Calrod heating elements or the like are commonly used in electric fry pans, waffle makers, and panini presses, for example.

Still further, it is contemplated that the graphite plate encapsulated by a cast aluminum shell according to my invention could also function as a cold tray or as a warming tray for food service use.

The graphite core plate 6 could also be made without the through holes 8 and instead be plated with a material such as nickel to improve the adherence of the cast metal shell 4. In addition, I contemplate that the type of graphite may be modified if desired to change the thermal conductivity characteristics of the graphite. For example, an oriented graphite may be employed which increases the thermal conductivity in the radial (x-y axes) direction and lowers the thermal conductivity in the transverse (y-axis) direction. In this manner, hot spots can be eliminated on the cook surface due to this "heat dam" effect.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. Cookware comprising a graphite core plate encapsulated in a cast aluminum metal shell, wherein the graphite core plate has a plurality of through holes formed therein, whereby the aluminum metal of the cast metal shell fills the holes of the graphite core plate and encapsulates an upper surface, a lower surface, and an outer side surface of the graphite core plate.

2. The cookware of claim 1 wherein the cookware is a grill plate having raised ribs integrally formed on a cook surface.

3. The cookware of claim 1 wherein the cookware is a griddle plate having a substantially flat surface.

4. The cookware of claim 1 having an anodized surface.

5. The cookware of claim 3 having an anodized surface.

6. The cookware of claim 1, wherein the cast metal shell has electrical heating means associated therewith.

7. The cookware of claim 6, comprising two cast metal shells hingedly connected at end portions to form one of a waffle iron or panini press.

8. The cookware of claim 1, wherein the aluminum metal shell has an upstanding rim around an outermost perimeter thereof and a collection trough between an upper end of the central portion and the upstanding rim, the collection trough being recessed relative to the central portion and the upstanding rim.

9. Cookware comprising:
   a graphite core plate having an upper surface, a bottom surface, and an outer side surface, the graphite core plate having a plurality of spaced-apart through holes extending through the graphite core plate; and
   a cast aluminum metal shell having an upper portion and a bottom portion, the cast aluminum metal shell surrounding the upper surface, the bottom surface, and the outer side surface of the graphite core plate and the cast aluminum metal shell formed within the plurality of through holes of the graphite core plate to fill the plurality of through holes and join the upper portion and the bottom portion of the cast aluminum metal shell.

10. The cookware of claim 9 having an anodized surface.

11. The cookware of claim 9, wherein the cookware is a grill plate having raised ribs integrally formed on a cook surface.

12. The cookware of claim 9, wherein the cookware is a griddle plate having a substantially flat surface.

13. The cookware of claim 9, wherein the cast metal shell has electrical heating means associated therewith.

14. The cookware of claim 13, comprising two cast metal shells hingedly connected at end portions to form one of a waffle iron or panini press.

15. The cookware of claim 9, wherein the aluminum metal shell has an upstanding rim around an outermost perimeter thereof and a collection trough between an upper end of the central portion and the upstanding rim, the collection trough being recessed relative to the central portion and the upstanding rim.

\* \* \* \* \*